US011459702B2

(12) United States Patent
Chen

(10) Patent No.: US 11,459,702 B2
(45) Date of Patent: Oct. 4, 2022

(54) METHOD FOR MANUFACTURING PAPER, DEVICE FOR MANUFACTURING ADDITIVE FOR MANUFACTURING PAPER, AND DEVICE FOR MANUFACTURING PAPER

(71) Applicant: KURITA WATER INDUSTRIES LTD., Nakano-ku (JP)

(72) Inventor: Jiayi Chen, Nakano-ku (JP)

(73) Assignee: KURITA WATER INDUSTRIES LTD., Nakano-ku (JP)

( * ) Notice: Subject to any disclaimer, the term of this patent is extended or adjusted under 35 U.S.C. 154(b) by 13 days.

(21) Appl. No.: 16/332,969

(22) PCT Filed: Mar. 14, 2017

(86) PCT No.: PCT/JP2017/010127
§ 371 (c)(1),
(2) Date: Mar. 13, 2019

(87) PCT Pub. No.: WO2018/051549
PCT Pub. Date: Mar. 22, 2018

(65) Prior Publication Data
US 2019/0226148 A1    Jul. 25, 2019

(30) Foreign Application Priority Data

Sep. 16, 2016    (JP) ............................. JP2016-182234

(51) Int. Cl.
*D21H 17/37* (2006.01)
*C08F 8/00* (2006.01)
(Continued)

(52) U.S. Cl.
CPC ............. *D21H 17/375* (2013.01); *C08F 8/00* (2013.01); *C08F 20/56* (2013.01); *D21H 17/42* (2013.01); *D21H 17/56* (2013.01); *D21H 21/20* (2013.01)

(58) Field of Classification Search
None
See application file for complete search history.

(56) References Cited

U.S. PATENT DOCUMENTS

| 4,717,758 A | 1/1988 | Ogawa et al. |
| 5,342,876 A * | 8/1994 | Abe .......................... A61K 8/25 524/493 |

(Continued)

FOREIGN PATENT DOCUMENTS

| CA | 2 881 868 A1 | 2/2014 |
| CN | 105593435 A | 5/2016 |

(Continued)

OTHER PUBLICATIONS

Smook, Gary A., Handbook of Pulp and Paper Terminology, Angus Wilde Publications, 1990, p. 220. (Year: 1990).*

(Continued)

*Primary Examiner* — Dennis R Cordray
(74) *Attorney, Agent, or Firm* — Oblon, McClelland, Maier & Neustadt, L.L.P.

(57) ABSTRACT

Provided are a method for manufacturing paper with which it is possible to easily manufacture paper wherein water-filterability and yield are excellent and hydrophilia is suppressed without using a cationic polymer or silica, a device for manufacturing an additive for manufacturing paper, and a device for manufacturing paper. The method for manufacturing paper is a method having a reactant generating step for generating a reactant by subjecting an acrylamide polymer to a Hoffman elimination reaction, and a supply step for supplying the reactant to a paper machine within 24 hours of the start of the Hoffman elimination reaction. The acrylamide polymer preferably includes an acrylamide polymer having a intrinsic viscosity of 12.5-28 dl/g and anionization of 0.3 meq/g or less.

16 Claims, 2 Drawing Sheets

(51) Int. Cl.
*C08F 20/56* (2006.01)
*D21H 17/56* (2006.01)
*D21H 21/20* (2006.01)
*D21H 17/42* (2006.01)

(56) References Cited

U.S. PATENT DOCUMENTS

| | | | |
|---|---|---|---|
| 5,530,069 A * | 6/1996 | Neff | C08F 8/12 |
| | | | 525/329.4 |
| 5,543,074 A * | 8/1996 | Hague | A61K 8/891 |
| | | | 510/122 |
| 2008/0196851 A1 | 8/2008 | Hund et al. | |
| 2013/0139986 A1 | 6/2013 | Faucher et al. | |
| 2016/0311940 A1 | 10/2016 | Hund et al. | |
| 2018/0327972 A1 * | 11/2018 | Zhang | D21H 21/10 |

FOREIGN PATENT DOCUMENTS

| | | |
|---|---|---|
| JP | 49-18482 B2 | 5/1974 |
| JP | 60-141750 A | 7/1985 |
| JP | 62-45798 A | 2/1987 |
| JP | 4-23810 A | 1/1992 |
| JP | 10-25691 A | 1/1998 |
| JP | 2000-170092 A | 6/2000 |
| JP | 2005-226200 A | 8/2005 |
| JP | 2007-46180 A | 2/2007 |
| JP | 2015-78453 A | 4/2015 |
| JP | 2015-209610 A | 11/2015 |
| WO | WO 2006/075115 A2 | 7/2006 |
| WO | WO 2012/017172 A1 | 2/2012 |
| WO | WO 2014/029593 A1 | 2/2014 |
| WO | WO 2015/107302 A1 | 7/2015 |

OTHER PUBLICATIONS

Extended European Search Report dated Apr. 24, 2019 in Patent Application No. 17850457.7, 6 pages.
International Search Report dated Jun. 20, 2017 in PCT/JP2017/010127 filed on Mar. 14, 2017.
Japanese Office Action dated Jun. 13, 2017 in corresponding Japanese Patent Application No. 2016-182234.
Japanese Office Action dated Jan. 16, 2018 in corresponding Japanese Patent Application No. 2016-182234.
Japanese Office Action dated Aug. 28, 2018 in corresponding Japanese Patent Application No. 2016-182234.
Office Action dated May 7, 2021, in Chinese Patent Application No. 201780055448.5 filed Mar. 14, 2017.
Office Action dated Apr. 29, 2021, in Brazilian Patent Application No. BR112019004772.7 filed Mar. 14, 2017.

* cited by examiner

METHOD FOR MANUFACTURING PAPER, DEVICE FOR MANUFACTURING ADDITIVE FOR MANUFACTURING PAPER, AND DEVICE FOR MANUFACTURING PAPER

TECHNICAL FIELD

The present invention relates to a method for manufacturing paper, a device for manufacturing an additive for manufacturing paper, and a device for manufacturing paper.

BACKGROUND ART

Speed-up of a paper machine and an increase in the product yield can be achieved by enhancing water filtration in the paper machine. Regarding conventional additives for manufacturing paper that enhance such water-filterability and product yield, cationic polymers and colloidal silica are known.

It is described in Patent Document 1 that predetermined Hofmann degradation reactants enhance water-filterability.

Patent Document 1: Japanese Unexamined Patent Application, Publication No. 2015-78453

DISCLOSURE OF THE INVENTION

Problems to be Solved by the Invention

However, the cationic polymers described above are such that the texture may collapse when water-filterability is enhanced. Furthermore, silica is such that when the cationic demand in the paper-making raw material increases, or the ash content increases, the effect is noticeably lowered.

The Hofmann degradation reactant described in Patent Document 1 may be described as a material that has solved the difficulties of the cationic polymers or silica. However, since the rate of deterioration is high, on the occasion of supplying the agent by a conventional distribution process, it is necessary to suppress the rate of deterioration as far as possible by using a neutralization treatment with a strong acid (hydrochloric acid, sulfuric acid, or the like), and a reducing agent for reducing any excess oxidizing agent. As a result, the operation of the reaction becomes complicated.

Meanwhile, it is also required that the percentage water content of a wet paper web in the paper machine is low. When the percentage water content of the wet paper web is high, the amount of steam consumption at the drying unit of the paper machine becomes large.

The present invention was achieved in view of the above-described circumstances, and it is an object of the present invention to provide a method for manufacturing paper, by which satisfactory water-filterability and product yield are obtained even without using a cationic polymer or silica, and the percentage water content of a wet paper web is reduced; a device for manufacturing an additive for manufacturing paper, and a device for manufacturing paper.

Means for Solving the Problems

Specifically, the inventors of the present invention found that when an acrylamide polymer is subjected to a Hofmann degradation reaction, and then the reactant is supplied to a paper machine within in a short time period, water-filterability is enhanced. Thus, the inventors completed the present invention. More specifically, the present invention provides the following.

(1) A method for manufacturing paper, the method including: a reactant generating step for generating a reactant by subjecting an acrylamide polymer to a Hofmann degradation reaction and; a supply step for supplying the reactant to a paper machine within 24 hours from the start of the Hofmann degradation reaction.

(2) The method according to (1), in which the acrylamide polymer includes an acrylamide polymer having a intrinsic viscosity of 12.5 to 28 dl/g and a degree of anionization of 0.3 meq/g or less.

(3) The method according to (1) or (2), in which in the Hofmann degradation reaction, a hypohalous acid is mixed into a liquid including the acrylamide polymer under the conditions of a pH of 8.0 or higher.

(4) The method according to any one of (1) to (3), in which in the Hofmann degradation reaction, a hypohalous acid is added to the liquid including the acrylamide polymer together with an alkali.

(5) The method according to any one of (1) to (4), in which in the supply step, the reactant is supplied when the degree of cationization of the reactant is 50% or higher with respect to the maximum degree of cationization.

(6) The method according to any one of (1) to (5), in which in the Hofmann degradation reaction, a neutralizing agent is not added.

(7) The method according to any one of (1) to (6), in which old paper, a paper raw material including a loading material, or a paper raw material having a content of polyvalent metals of 1% by mass or less with respect to the pulp slurry, is used as a raw material of paper.

(8) A device for manufacturing an additive for manufacturing paper, the device including a reaction mechanism for subjecting an acrylamide polymer to a Hofmann degradation reaction, and further including a supply means capable of supplying the reactant to a paper machine within 24 hours from the start of the Hofmann degradation reaction.

(9) The device for manufacturing an additive for manufacturing paper according to (8), in which the acrylamide polymer includes an acrylamide polymer having a intrinsic viscosity of 12.5 to 28 dl/g and a degree of anionization of 0.3 meq/g or less.

(10) The device for manufacturing an additive for manufacturing paper according to (8) or (9), further including a means capable of mixing a hypohalous acid into a liquid including the acrylamide polymer in the Hofmann degradation reaction under the conditions of a pH of 8.0 or higher.

(11) The device for manufacturing an additive for manufacturing paper according to any one of (8) to (10), further including a means capable of adding an alkali, together with a hypohalous acid, into a liquid including the acrylamide polymer in the Hofmann degradation reaction.

(12) The device for manufacturing an additive for manufacturing paper according to any one of (8) to (11), further including a means capable of supplying the reactant when the degree of cationization of the reactant is 50% or higher with respect to the maximum degree of cationization.

(13) The device for manufacturing an additive for manufacturing paper according to any one of (8) to (12), in which a neutralizing agent is not added in the Hofmann degradation reaction.

(14) A device for manufacturing paper, the device including: the device for manufacturing an additive for manufacturing paper according to any one of (8) to (13); and a paper machine receiving the reactant supplied by the device for manufacturing an additive for manufacturing paper.

(15) The device for manufacturing paper according to (14), in which old paper, a paper raw material including a loading material, or a paper raw material having a content of polyvalent metals of 1% by mass or less with respect to the pulp slurry is used as a raw material of paper.

Effects of the Invention

According to the present invention, a method for manufacturing paper, by which satisfactory water-filterability and product yield are obtained even without using a cationic polymer or silica, and the percentage water content of a wet paper web is reduced; a device for manufacturing an additive for manufacturing paper; and a device for manufacturing paper can be provided.

PREFERRED MODE FOR CARRYING OUT THE INVENTION

In the following description, embodiments of the present invention will be described; however, the present invention is not intended to be limited to these.

<Method for Manufacturing Paper>

The method for manufacturing paper of the present invention is a method including a reactant generating step for generating a reactant by subjecting an acrylamide polymer to a Hofmann degradation reaction; and a supply step for supplying the reactant to a paper machine within 24 hours from the start of the Hofmann degradation reaction.

According to the method for manufacturing paper of the present invention, when a reactant obtained from a Hofmann degradation reaction of an acrylamide polymer is supplied to a paper machine as an additive for manufacturing paper within 24 hours from the start of the Hofmann degradation reaction, satisfactory water-filterability and product yield are obtained, and a reduction of the percentage water content of a wet paper web can be promoted.

Figure 1:
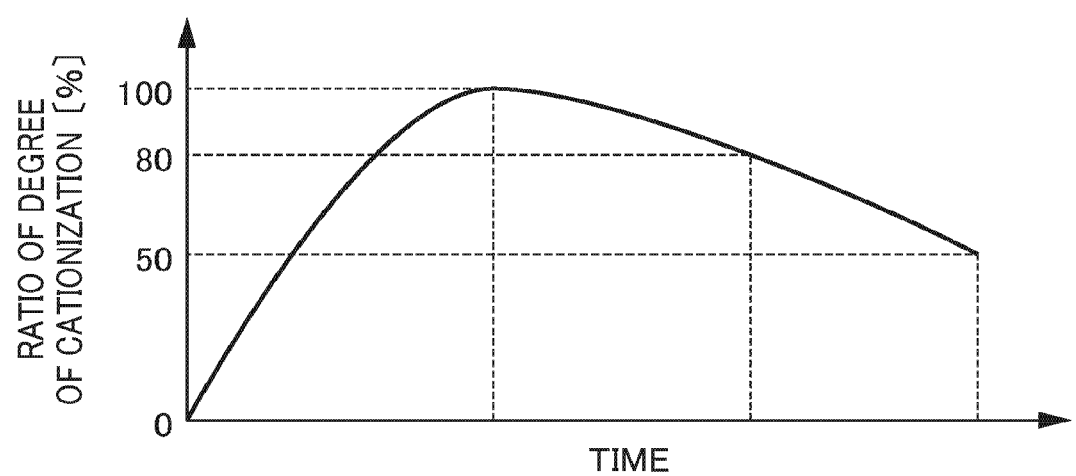
FIG. 1 is a graph showing the relationship between the time and the ratio of the degree of cationization of the reactant produced when an acrylamide polymer is supplied to a Hofmann degradation reaction.

As shown in FIG. 1, it was confirmed that the degree of cationization in the reactant increases from the start of the reaction, reaches a peak value at a predetermined time, and then mildly decreases. When the reactant is supplied to a paper machine as an additive for manufacturing paper while the degree of cationization is close to a peak value, satisfactory water-filterability and product yield are obtained, and a reduction of the percentage water content of a wet paper web can be promoted. Particularly, in a paper-making system in which a sulfuric acid band is not used, the effects are significant. As such, the inventors of the present invention found that in order to supply the reactant to a paper machine as an additive for manufacturing paper in a state in which the degree of cationization is close to a peak value, it is important to supply the reactant within 24 hours from the start of the Hofmann degradation reaction.

Furthermore, when the effect of reducing the percentage water content of the wet paper web is high, the moisture content of the wet paper web at the press inlet port is likely to decrease, and the occurrence of collapse is suppressed. In a conventional paper machine, since the steam consumption at the drying unit is a bottleneck in the paper-making speed of the paper machine, the reduction of the steam consumption leads to the speed-up of the paper machine and also leads to a decrease in the operating cost.

In a case in which a reactant that has been kept for more than 24 hours from the start of the Hofmann degradation reaction of an acrylamide polymer is supplied to a paper machine as an additive for manufacturing paper, satisfactory water-filterability and product yield are not obtained, and the effect of reducing the percentage water content of the wet paper web is reduced. This is because, as described above, the degree of cationization of the reaction liquid has decreased.

In the following description, the acrylamide polymer and the various steps will be described respectively.

[As to Acrylamide Polymer]

The acrylamide polymer used for the method for manufacturing paper of the present invention is not particularly limited; however, it is preferable that the acrylamide polymer is an acrylamide polymer having its intrinsic viscosity (value measured at 30° C. in a 1 N aqueous solution of $NaNO_3$) and its degree of anionization within predetermined ranges (for example, the intrinsic viscosity is 12.5 to 28 dl/g, and the degree of anionization is 0.3 meq/g or less). When the intrinsic viscosity and the degree of anionization are in predetermined value ranges, the additive for manufacturing paper may have a well-balanced and satisfactory effect in view of an increase in the product yield and an enhancement of water-filterability.

The intrinsic viscosity and the molecular weight of an acrylamide polymer are generally correlated to each other. That is, when the intrinsic viscosity decreases, the molecular weight is decreased, and water-filterability and product yield are decreased. Therefore, in order to enhance the water-filterability and the product yield, it is preferable that the intrinsic viscosity of the acrylamide polymer is 10.0 dl/g or higher, and more preferably 12.5 dl/g or higher. The intrinsic viscosity of the acrylamide polymer is more preferably 13.0 dl/g or higher, even more preferably 14.0 dl/g or higher, and most preferably 14.5 dl/g or higher. Furthermore, when the intrinsic viscosity of the acrylamide polymer is too high, the molecular weight becomes too large, and when the acrylamide polymer is added to a paper-manufacturing process, the acrylamide-based acts as a flocculant, causing a collapse of the texture of produced paper. Therefore, in order to prevent flocculation, it is preferable that the intrinsic viscosity of the acrylamide polymer is 40 dl/g or less, and more preferably 28 dl/g or less. The intrinsic viscosity of the acrylamide polymer is more preferably 24 dl/g or less, even more preferably 20 dl/g or less, and most preferably 16 dl/g or less.

When the degree of anionization of the acrylamide polymer is too high, an ionic reaction between a cationic group and an anionic group occurs within an acrylamide polymer molecule, and therefore, the product yield and water-filterability are decreased. Therefore, the degree of anionization of the acrylamide polymer for increasing the product yield is preferably 0.3 meq/g or less, more preferably 0.1 meq/g or less, even more preferably 0.05 meq/g or less, still more preferably 0.03 meq/g or less, and most preferably 0.01 meq/g or less.

The intrinsic viscosity was obtained by measuring the flow-down time using a Cannon-Fenske viscometer, and calculating the intrinsic viscosity using the Huggins equation and the Mead-Fuoss formula from the measured value. Furthermore, the degree of anionization is expressed by a colloid equivalent value, and the colloid equivalent value is measured by the following method as described in paragraph 0029 of Japanese Unexamined Patent Application, Publication No. 2009-228162.

[Method for Measuring Colloid Equivalent Value of Anion]

An anionic polymer compound diluted in a 50-ppm aqueous solution (diluted with pure water) is collected in a 100-ml graduated cylinder and is transferred into a 200-ml beaker. While the dilution is stirred by introducing a rotor therein, 0.5 ml of an N/10 solution of sodium hydroxide (manufactured by Wako Pure Chemical Industries, Ltd.) is added to the dilution using a transfer pipette, and then 5 ml of an N/200 methyl glycol chitosan solution is added to the mixture using a transfer pipette. Two or three drops of Toluidine Blue indictor (manufactured by Wako Pure Chemical Industries, Ltd.) are added to the mixture, and the mixture is titrated with an N/400 polyvinyl alcohol potassium sulfate solution (manufactured by Wako Pure Chemical Industries, Ltd.). The time point at which blue color turns into reddish purple color, and the reddish purple color does not disappear even after several seconds, is considered as the end point. Similarly, a blank test is performed using pure water (blank).

Colloid equivalent value of anion (meq/g)=[Measured value of anionic polymer compound (ml)−titer of blank test (ml)]/2

According to the present invention, an acrylamide polymer means a polymer obtainable by subjecting acrylamide to a polymerization reaction, and the polymer may include another cationic monomer. Furthermore, the acrylamide polymer may or may not include an anionic monomer; however, it is preferable, as described above, that the acrylamide polymer obtained by a polymerization reaction has a intrinsic viscosity of 12.5 to 28 dl/g and a degree of anionization of 0.3 meq/g or less. However, in order to increase the product yield by lowering the degree of anionization and suppressing hydrolytic degradation of the acrylamide polymer at the time of polymerization, it is preferable not to incorporate an anionic monomer.

Examples of a cationic monomer that may be incorporated into the acrylamide polymer include acrylonitrile, diallyldimethylammonium chloride (DADMAC), and N,N-dimethyl-1,3-propanediamine (DMAPA).

Furthermore, it is preferable that the acrylamide polymer has a straight-chain structure (linear polymer) in order to further enhance the water-filterability and product yield of the additive for manufacturing paper and to reduce the percentage water content of the wet paper web. That is, it is preferable that a crosslinkable monomer is not incorporated into the polymerization reaction as a monomer other than the acrylamide used for the polymerization reaction of the acrylamide polymer.

Examples of the solvent that can be used for the polymerization reaction of the acrylamide polymer include water, an alcohol, and dimethylformamide. In consideration of the production cost, water is preferred.

The polymerization initiator for the acrylamide polymer is not particularly limited as long as the polymerization initiator dissolves in a solvent. Examples include azo compounds such as 2,2'-azobis-2-amidinopropane hydrochloride, azobisisobutyronitrile, and 2,2'-azobis-2,4-dimethylvaleronitrile. Further examples include peroxide-based compounds such as ammonium persulfate, potassium persulfate, hydrogen peroxide, ammonium peroxodisulfate, benzoyl peroxide, lauroyl peroxide, succinic peroxide, octanoyl peroxide, and t-butyl peroxy-2-ethylhexanoate. Further examples include redox systems obtained by combining ammonium peroxodisulfate with sodium sulfite, sodium hydrogen sulfite, tetramethylethylenediamine, trimethylamine, or the like. It is preferable that a chain transfer agent is used in combination for the polymerization reaction. Examples of the chain transfer agent include alkylmercaptans, thioglycolic acid and esters thereof, isopropyl alcohol; and monomers having a (meth)allyl group, such as allyl alcohol, allylamine, and (meth)allylsulfonic acid, and salts thereof.

The temperature and time of the polymerization reaction of the acrylamide polymer may be adjusted such that the acrylamide polymer thus obtainable acquires a desired intrinsic viscosity and a desired degree of anionization. For example, in order to cause the acrylamide polymer thus obtainable to acquire a intrinsic viscosity of 12.5 to 28 dl/g and a degree of anionization of 0.3 meq/g or less, for example, an acrylamide polymer that satisfies the above-described conditions can be polymerized by setting the start temperature to a low temperature and gradually increasing the temperature. When the start temperature is too high, the intrinsic viscosity is lowered, and at the time of reaction, a hydrolysate of acrylamide is produced, which causes an increase in the degree of anionization. Therefore, it is desirable that the start temperature is low. More specifically, the start temperature is preferably 10° C. to 30° C., more preferably 15° C. to 25° C., and even more preferably 18° C. to 22° C. Furthermore, from the viewpoint that heat generation at the time of polymerization is easily controllable, the upper limit of the temperature increasing after the start of polymerization is preferably 80° C. or lower, more preferably 70° C. or lower, and even more preferably 65° C. or lower.

[Reactant Generating Step]

In the reactant generating step, a reactant that can be utilized as an additive for manufacturing paper having a water-filterability enhancing effect and a product yield increasing effect sufficiently in a well-balanced manner, by subjecting the above-mentioned acrylamide polymer to a Hofmann degradation reaction.

In the case of performing a Hofmann degradation reaction, the solution obtained by subjecting the acrylamide polymer to a polymerization reaction may be used directly, or may be used after being diluted. Furthermore, if necessary, it is also acceptable to prepare another separate solution.

When the concentration of the acrylamide polymer supplied to a Hofmann degradation reaction is set to be high, a non-uniform reaction occurs, and a sufficient product yield increasing effect and a sufficient water-filterability enhancing effect may not be obtained. In order to obtain these effects sufficiently, it is preferable that the concentration of the acrylamide polymer is 35% by mass or less. The concentration of the acrylamide polymer is more preferably 10% by mass or less, even more preferably 5% by mass or less, and most preferably 2% by mass or less. Furthermore, when the concentration of the acrylamide polymer is too low, the efficiency of the Hofmann degradation reaction becomes poor. Therefore, the concentration of the acrylamide polymer is preferably 0.001% by mass or more, more preferably 0.01% by mass or more, and even more preferably 0.1% by mass or more.

It is preferable that the Hofmann degradation reaction is performed by subjecting an amide group of an acrylamide polymer to the action of a hypohalous acid under alkaline conditions. Specifically, the Hofmann degradation reaction may be carried out at under the conditions of a pH in the range of 8.0 or higher, and preferably at a pH in the range of 11 to 14. In order to obtain alkaline conditions, for example, an alkali metal hydroxide such as sodium hydroxide, potassium hydroxide, or lithium hydroxide is used. Furthermore, in order to subject the amide group to the action of a hypohalous acid, for example, a hypohalous acid salt such as a hypochlorous acid salt, a hypobromous acid salt, or a hypoiodous acid salt is used.

Examples of the hypochlorous acid salt, hypobromous acid salt, and hypoiodous acid salt include alkali metal salts or alkaline earth metal salts of these acids. Examples of the alkali metal of hypochlorous acid include sodium hypochlorite, potassium hypochlorite, and lithium hypochlorite.

The amount of the hypohalous acid salt supplied to the Hofmann degradation reaction is not particularly limited; however, when the amount of the acrylamide polymer with respect to the hypohalous acid salt is too small or too large, the amount of the acrylamide polymer or hypohalous acid salt that is not used in the reaction becomes large. Therefore, the efficiency of the reaction is decreased. In order to perform the reaction efficiently, the molar ratio of the hypohalous acid salt and the acrylamide polymer is preferably 0.1:10 to 10:10, more preferably 1:10 to 10:10, and even more preferably 2:10 to 10:10.

In regard to the Hofmann degradation reaction according to the present invention, it is preferable that the hypohalous acid is mixed into the liquid including the acrylamide polymer under the conditions of a pH of 8.0 or higher. Thereby, gelation of the reactant can be prevented. Furthermore, in regard to the Hofmann degradation reaction, it is preferable that an alkali is added, together with the hypohalous acid, to the liquid including the acrylamide polymer. Thereby, gelation of the reactant can be prevented. Regarding the alkali, any conventionally known alkali (an alkali metal hydroxide such as sodium hydroxide, potassium hydroxide, or lithium hydroxide as described above) can be used.

Regarding the temperature for the Hofmann degradation reaction, the reaction can be carried out at 0° C. to 110° C.; however, in order to obtain the desired degree of cationization described above, the temperature may be selected as a combination with the reaction time. For example, in the case of supplying the reactant within 24 hours, it is preferable to perform the Hofmann degradation reaction at 10° C. to 50° C. (more preferably 10° C. to 30° C.).

In regard to the reactant generating step described above, a neutralizing agent may be added before the next supply step is initiated; however, it is preferable that a neutralizing agent is not added. By adding a neutralizing agent, the effect of enhancing water-filterability and the product yield, and the effect of reducing the percentage water content of the wet paper web tend to decrease. An example of the neutralizing agent may be a pH adjusting agent (for example, hydrochloric acid) that is conventionally known to be used for the neutralization of the Hofmann degradation reaction.

<Supply Step>

The supply step is a step for supplying the reactant to a paper machine within 24 hours from the start of the Hofmann degradation reaction in the reactant generating step.

Specifically, the reactant is supplied to a paper machine as an additive for manufacturing paper and is produced as a pulp slurry for paper-making together with a paper raw material.

Specifically, the time taken for the reactant to be introduced into a paper machine may vary depending on the type of the reactant and temperature; however, it is preferable that the degree of cationization is greater than or equal to a predetermined value. More preferably, for example, the degree of cationization is 24 hours or less, 18 hours or less, 12 hours or less, 6 hours or less, 3 hours or less, 2 hours or less, or 1 hour or less. Furthermore, the lower limit may vary depending on the type of the reactant and temperature; however, it is necessary that the Hofmann degradation reaction proceeds to a certain extent, and the degree of cationization has value greater than or equal to a predetermined value. Thus, the reaction time is, for example, 10 minutes or more, 20 minutes or more, or 30 minutes or more. Generally, in a case in which the temperature of the reactant is high, a relatively short time is needed, and in a case in which the temperature of the reactant is low, a relatively long time is needed.

The time taken for the reactant to be introduced into a paper machine may be determined by taking the degree of cationization of the reactant as an index. For example, it is preferable that the reactant is supplied to a paper machine when the degree of cationization of the reactant is preferably 50% or higher, more preferably 60% or higher, even more preferably 70% or higher, and still more preferably 80% or higher, with respect to the maximum degree of cationization. As described above, the degree of cationization in the reactant increases from the start of the reaction, reaches a peak for a predetermined time, and then gently decreases as shown in FIG. 1. A ratio of the degree of cationization of 100% in FIG. 1 indicates the maximum degree of cationization, and for example, a ratio of the degree of cationization of 50% in FIG. 1 is a degree of cationization of 50% with respect to the maximum degree of cationization, and a ratio of the degree of cationization of 80% in FIG. 1 is a degree of cationization of 80% with respect to the maximum degree of cationization.

The degree of cationization of the reactant is expressed as a colloid equivalent value, similarly to the degree of anionization, and is measured by the following method.

[Method for Measuring Colloid Equivalent Value of Cation]

An anionic polymer compound diluted in a 50-ppm aqueous solution (diluted with pure water) is collected in a 100-ml graduated cylinder and is transferred into a 200-ml beaker. While the dilution is stirred by introducing a rotor therein, a 0.5 wt % aqueous solution of sulfuric acid is added to the dilution using a transfer pipette, and the mixture is adjusted to pH 3. Next, two or three drops of Toluidine Blue indictor (manufactured by Wako Pure Chemical Industries, Ltd.) are added to the mixture, and the mixture is titrated with an N/400 polyvinyl alcohol potassium sulfate solution (manufactured by Wako Pure Chemical Industries, Ltd.). The time point at which blue color turns into reddish purple color, and the reddish purple color does not disappear even after several seconds, is considered as the end point. Similarly, a blank test is performed using pure water (blank).

Colloid equivalent value of cation (meq/g)=[Measured value of reactant (ml)−titer of blank test (ml)]/2

[Paper Raw Material]

The paper raw material may be so-called virgin pulp such as chemical pulp (also referred to as "kraft pulp") or mechanical pulp, or may also be old paper such as the manufacture residue (waste stuff) from a paper-manufacturing process or old paper for regeneration. According to the present invention, old paper, a paper raw material including a loading material (calcium carbonate, clay, talc, or the like), or a paper raw material having a content of polyvalent metals (aluminum and the like) of 1% by mass or less with respect to the pulp slurry is particularly preferable from the viewpoint that high water-filterability, a high effect of increasing the product yield, and a high effect of reducing the percentage water content of the wet paper web are obtained.

<Device for Manufacturing Additive for Manufacturing Paper and Device for Manufacturing Paper>

Figure 2:
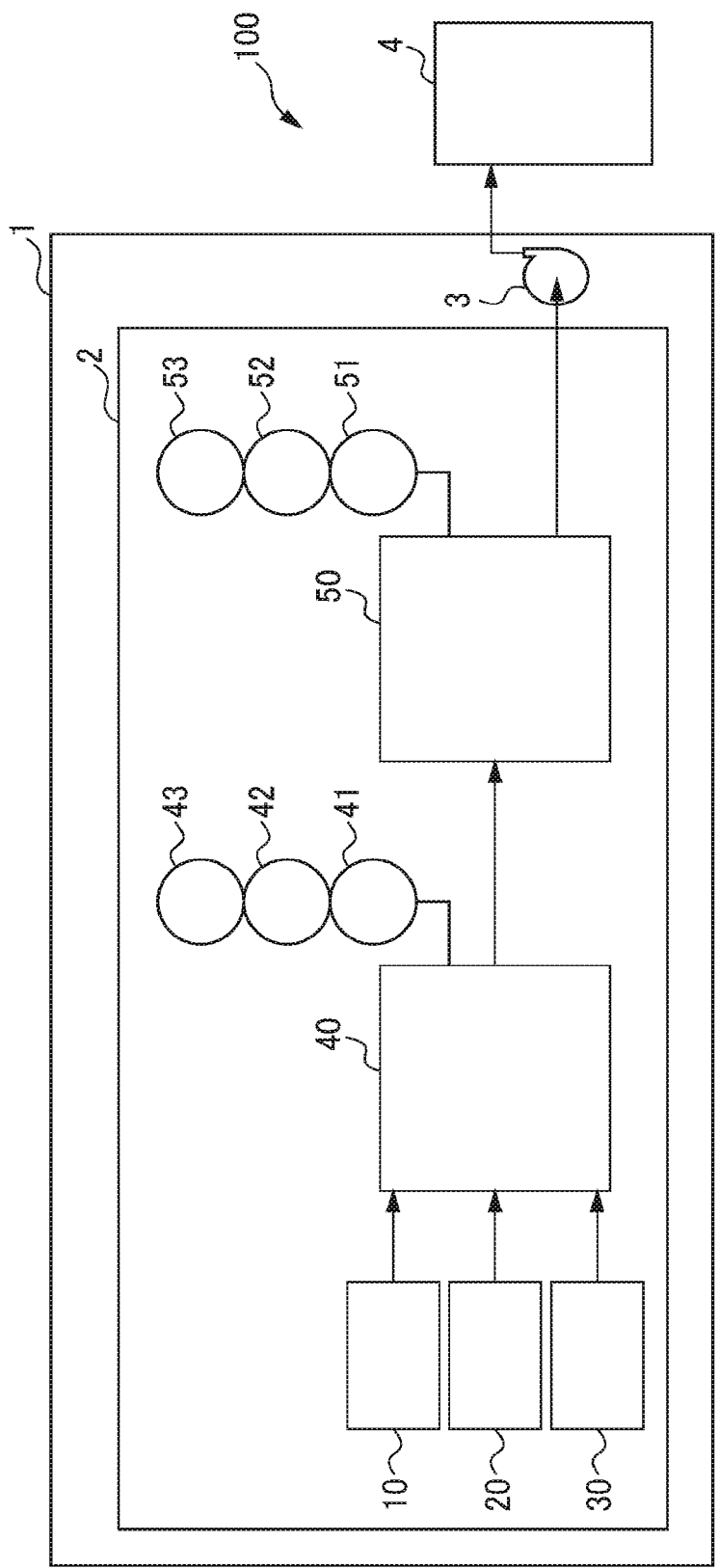
FIG. 2 is a configuration diagram illustrating an embodiment of the device for manufacturing an additive for manufacturing paper and a device for manufacturing paper according to the present invention.

In the following description, a device for manufacturing an additive for manufacturing paper and a device for manufacturing paper will be described. FIG. 2 is a configuration diagram illustrating the configuration of the device for manufacturing an additive for manufacturing paper and the device for manufacturing paper of the present invention. As illustrated in FIG. 2, the device for manufacturing paper 100 includes a device for manufacturing an additive for manufacturing paper 1 and a paper machine 4. The device for manufacturing an additive for manufacturing paper 1 includes a reaction mechanism 2 for subjecting an acrylamide polymer to a Hofmann degradation reaction; and a chemical injection pump 3, which is a supply means capable of supplying the reactant to a paper machine within 24 hours from the start of the Hofmann degradation reaction. It is preferable that the acrylamide polymer used herein includes an acrylamide polymer having a intrinsic viscosity of 12.5 to 28 dl/g and a degree of anionization of 0.3 meq/g or less, as described above.

In the following description, the various configurations for an embodiment of the device for manufacturing an additive for manufacturing paper 1 will be described in detail using FIG. 2.

[Reaction Mechanism]

The reaction mechanism 2 for subjecting an acrylamide polymer to a Hofmann degradation reaction mainly includes a polymer supply unit 10 that supplies an acrylamide polymer; a hypohalous acid supply unit 20 that supplies a hypohalous acid; a sodium hydroxide supply unit 30 that supplies sodium hydroxide as an alkali; a reaction unit 40 that mixes these acrylamide polymer, hypohalous acid, and sodium hydroxide, and subjecting the mixture to a Hofmann degradation reaction; and a storage unit 50 that stores the reaction liquid in the reaction unit 40.

The polymer supply unit 10 supplies a predetermined amount of an acrylamide polymer held therein to the reaction unit 40 by means of a pump or the like at a predetermined timing.

The hypohalous acid supply unit 20 supplies a predetermined amount of a hypohalous acid held therein to the reaction unit 40 by means of a pump or the like at a predetermined timing.

The sodium hydroxide supply unit 30 supplies a predetermined amount of sodium hydroxide held therein to the reaction unit 40 by means of a pump or the like at a predetermined timing.

The reaction unit 40 uniformly mixes the acrylamide polymer, the hypohalous acid, and sodium hydroxide using a stirrer or the like, and produces a reaction liquid. Furthermore the reaction unit 40 may include a temperature sensor 41 that detects the liquid temperature of the reaction liquid; a liquid level sensor 42 that detects the liquid level of the reaction liquid; a pH sensor 43 that detects the pH of the reaction liquid; and the like. When the reaction unit 40 includes these temperature sensor 41, liquid level sensor 42, and pH sensor 43, it becomes easy to control the Hofmann degradation reaction, and it is possible to control the reaction unit so as to supply the reaction liquid to the storage unit 50 at an appropriate timing.

The device for manufacturing an additive for manufacturing paper 1 may also be configured to further include a means capable of mixing a liquid including the acrylamide polymer with the hypohalous acid under the conditions of a pH of 8.0 or higher in the Hofmann degradation reaction. Examples of the means capable of mixing can be configured to include, for example, the polymer supply unit 10; the hypohalous acid supply unit 20; the sodium hydroxide supply unit 30; and the reaction unit 40. For example, a hypohalous acid can be supplied from the hypohalous acid supply unit 20 into the reaction unit 40, in a state in which a liquid at pH 8.0 or higher, which includes an acrylamide polymer, is stored in the reaction unit 40 as a result of supply from the polymer supply unit 10 and the sodium hydroxide supply unit 30.

The device for manufacturing an additive for manufacturing paper 1 may configure to further include a means capable of adding an alkali, together with a hypohalous acid, to a liquid including an acrylamide polymer in the Hofmann degradation reaction. The means capable of addition may be configured to include, for example, the polymer supply unit 10; the hypohalous acid supply unit 20; the sodium hydroxide supply unit 30; and the reaction unit 40. For example, a hypohalous acid and sodium hydroxide can be supplied simultaneously into a reaction unit 40 composed of a hypohalous acid supply unit 20 and a sodium hydroxide supply unit 30, in a state in which a liquid including an acrylamide polymer is stored in the reaction unit 40 as a result of the supply from the polymer supply unit 10.

The storage unit 50 stores the reaction liquid supplied from the reaction unit 40 and makes the reaction liquid uniform by means of a stirrer or the like. The storage unit 50 may include a temperature sensor 51 that detects the liquid temperature of the reaction liquid; a liquid level sensor 52 that detects the liquid level of the reaction liquid; a pH sensor 53 that detects the pH of the reaction liquid; and the like. When the storage unit 50 includes these temperature sensor 51, liquid level sensor 52, and pH sensor 53, it is possible to control the storage unit so as to supply the reaction liquid to the paper machine 4 at an appropriate timing.

[Chemical Injection Pump 3]

The chemical injection pump supplies a predetermined amount of the reaction liquid in the storage unit 50 to the paper machine at a predetermined timing. Here, a predetermined timing is within 24 hours from the start of the Hofmann degradation reaction at the reaction unit 40 and is determined as appropriate depending on the composition of the reactant and temperature. The supply may be carried out by automatically detecting whether the predetermined timing has been reached, or may be carried out manually when the predetermined timing has been reached.

The device for manufacturing an additive for manufacturing paper 1 may be configured to further include a means capable of supplying the reactant at the time when the degree of cationization of the reactant is 50% or higher with respect to the maximum degree of cationization. The means capable of supplying can be configured to include a chemical injection pump 3. For example, a means for measuring the degree of cationization of the reactant may be provided, and the supply may be carried out by automatically detecting that a predetermined degree of cationization has been reached.

[Paper Machine 4]

The paper machine 4 is not particularly limited, and any conventionally known paper machine can be used. Generally, the paper machine 4 is configured to include a paper stock flowout unit (stock inlet), a dehydration unit (wire part), a compression and water extraction unit (press part), a drying unit (dryer part), and the like.

In regard to the device for manufacturing paper 100 having the above-described configuration, first, a predetermined amount of an acrylamide polymer is supplied into the reaction unit 40 by the polymer supply unit 10, subsequently a predetermined amount of a hypohalous acid and a predetermined amount of sodium hydroxide are supplied from the hypohalous acid supply unit 20 and the sodium hydroxide supply unit 30 into the reaction unit 40, and the mixture is stirred for a predetermined time in a state in which a Hofmann degradation reaction has been started. At this time, in the reaction unit 40, the Hofmann degradation reaction may be carried out under the conditions of a pH in the range of 8.0 or higher, and preferably a pH in the range of 11 to 14.

The reaction liquid that has been stirred for a predetermined time in the reaction unit 40 is supplied to the storage unit 50 and is retained while being stirred for a predetermined time by a stirrer or the like. The reaction liquid in the storage unit 50 is introduced, after a predetermined time has elapsed from the start of the reaction in the reaction unit 40, to the paper machine 4 (paper stock flowout unit) by the chemical injection pump 3 as an additive for manufacturing paper.

The timing at which the reaction liquid is introduced into the paper machine 4 may be a time that has been set in advance, or may be a time that has been set in advance depending on the temperature detected by the temperature sensor 51.

The adjustment of the temperature of the reaction liquid in the reaction unit 40 or the storage unit 50 may be carried out using an external cooling device or heating device; however, for example, the adjustment of the temperature may also be carried out by adjusting the height of the liquid level of the reaction liquid in the reaction unit 40 or the storage unit 50. For example, in a case in which it is wished to lower the temperature of the reaction liquid in the storage unit 50, lowering of the temperature may be carried out by supplying the reaction liquid from the reaction unit 40 to the storage unit 50, and raising the liquid level of the reaction liquid in the storage unit 50. Such adjustment of the temperature of the reaction liquid may be carried out by means of a control unit that is connected to temperature sensors 41 and 51 and liquid level sensors 42 and 52. This control unit may be set so as to control the timing (elapsed time from the start of the reaction) at which the reaction liquid is introduced into the paper machine 4 depending on the controlled temperature.

In the paper machine 4, although not depicted in the diagram, the paper raw material and the reaction liquid produced in the device for manufacturing an additive for manufacturing paper 1 are mixed, the mixture is sent to the dehydration unit through the flow-out unit and is dehydrated, and a paper layer is formed. The paper layer that has been subjected to a dehydration process is further dehydrated by pressure in the compression and water extraction unit, and then the paper layer is subjected to paper-making by being dried in the drying unit. The paper thus made is usually subjected to a drying process, various processes at a coating unit, a glossing unit, and a winding unit, and then to a finish processing.

The above-described embodiment is merely an embodiment of the device for manufacturing an additive for manufacturing paper and the device for manufacturing paper of the present invention, and the embodiment may be modified as appropriate. For example, in the present embodiment, a configuration including a reaction unit 40 and a storage unit 50 is employed; however, when the reaction liquid is produced in a uniform state, the configuration is not particularly limited, and for example, an embodiment in which the reaction liquid is uniformly produced while being conveyed in a pipe at a predetermined flow rate may be employed.

Furthermore, in regard to the present embodiment, an example in which the supply means is a chemical injection pump 3, and the reaction liquid is supplied on-site to the paper machine 4, is illustrated. However, the invention is not limited to this, and it is needless to say that a configuration in which a reaction mechanism 2 for subjecting an acrylamide polymer to a Hofmann degradation reaction; and a paper machine 4 are provided at different places, may also be employed. In this case, the reaction mechanism 2 may include, for example, a detection means for detecting the time that has elapsed from the start of the Hofmann degradation reaction; and a discharge means for discharging the reactant outside after a lapse of a predetermined time, as supply means. It is desirable that the reactant discharged by the discharge means is supplied to the paper machine within a predetermined time.

It is preferable that the additive for manufacturing paper produced in the device for manufacturing an additive for manufacturing paper of the present invention is a water-filtering agent.

EXAMPLES

Examples 1 to 7

A pulp slurry beaten to a CSF (Canadian Standard Freeness) value of 150 ml was produced using a corrugated cardboard of 100% old paper as a paper raw material, and a pulp solution was produced by diluting the pulp slurry with tap water to a concentration of 1% by mass. Then, 1% by mass (proportion added to the solid content of the pulp slurry) of aluminum sulfate was added to this pulp solution.

Meanwhile, an acrylamide polymer having a degree of anionization of 0.04 meq/g and a intrinsic viscosity of 14 dl/g (hereinafter, described as polymer A in the table) was diluted, and a reaction liquid at pH 11 that would serve as an additive for manufacturing paper was produced by adding sodium hypochlorite and a predetermined amount of sodium hydroxide such that the molar ratio of the acrylamide polymer and sodium hypochlorite (hereinafter, described as hypohalous acid in the table) would 10:4. Then, after a lapse of 4 hours from the start of reaction of the reaction liquid, this reaction liquid was added to the pulp solution at a rate of 0.5 kg/t (proportion of addition with respect to the solid content of the pulp slurry), and the mixture was stirred for 10 seconds at 800 rpm. Thus, a pulp slurry for paper-making was produced, and this was introduced into a paper machine.

Examples 2 to 7

Pulp slurries for paper-making were produced in the same manner as in Example 1, by changing the amount of addition of aluminum sulfate and the molar ratio of an acrylamide polymer and sodium hypochlorite as indicated in Table 1.

Comparative Examples 1 to 3

As an additive for manufacturing paper, a pulp slurry for paper-making was produced in the same manner as in Example 1, by using 0.5 kg/t of a cationic acrylamide polymer (trade name: HI-FOAM 201, manufactured by Kurita Water Industries, Ltd.) (hereinafter, indicated as CPAM in the table) and changing the amount of addition of aluminum sulfate as indicated in Table 1.

Comparative Example 4

A pulp slurry for paper-making was produced in the same manner as in Comparative Example 1, except that 0.5 kg/t of silica was added.
[Evaluation 1]
An evaluation of the pulp slurries for paper-making of Examples 1 to 7 and Comparative Examples 1 to 4 was carried out. Water-filterability is evaluated by a CSF measurement method. The percentage water content of a wet paper web (press dehydrability) is measured using a DDA (Dynamic Drainage Analyzer: manufactured by AB Akribi Kemikonsulter AB). The content ratio is measured using a DFS (Dynamic Filtration System: manufactured by Mutech, Ltd.). The results are shown in Table 1.

percentage water content of a wet paper web can be decreased, and the manufacturing method is particularly effective for systems that do not include polyvalent metals in particular.

Example 8

A pulp slurry beaten to a CSF (Canadian Standard Freeness) value of 450 ml was produced by using 85% by mass of hardwood bleached pulp (LBKP) and 15% by mass of calcium carbonate, and the pulp slurry was diluted with tap water to a concentration of 1% by mass. Thus, a pulp solution was produced.

Meanwhile, an acrylamide polymer having a degree of anionization of 0.04 meq/g and a intrinsic viscosity of 14 dl/g was diluted, and sodium hypochlorite and a predetermined amount of sodium hydroxide were added such that the molar ratio of the acrylamide polymer and sodium

TABLE 1

| | Polymer (Polymer:Hypohalous acid) | Aluminum sulfate [%] | CSF degree of water-filterability | Percentage water content of wet paper web [%] | DDA pressure [Mbar] | Product yield [%] |
|---|---|---|---|---|---|---|
| Example 1 | Polymer A (13:4) | 1 | 219 | 75.3 | 248 | 76.9 |
| Example 2 | Polymer A (10:4) | 0.5 | 218 | 75.5 | 246 | 76.2 |
| Example 3 | Polymer A (10:4) | 0 | 216 | 75.6 | 245 | 76.1 |
| Example 4 | Polymer A (10:1) | 1 | 208 | 76.2 | 243 | 77.3 |
| Example 5 | Polymer A (10:1) | 0 | 207 | 76.7 | 240 | 76.9 |
| Example 6 | Polymer A (10:10) | 1 | 225 | 74.8 | 246 | 76.3 |
| Example 7 | Polymer A (10:10) | 0 | 222 | 75.1 | 242 | 75.8 |
| Comparative Example 1 | CPAM | 1 | 255 | 78.5 | 209 | 78.5 |
| Comparative Example 2 | CPAM | 0.5 | 226 | 72.0 | 215 | 75.1 |
| Comparative Example 3 | CPAM 0.5 kg/t | 0 | 188 | 77.0 | 283 | 63.6 |
| Comparative Example 4 | CPAM 500 g/t Silica 0.5 kg/t | 1 | 258 | 78.3 | 207 | 78.9 |

[Results and Discussion]

From the results of Table 1, it was confirmed that in Examples 1 to 7 in which old paper was used as a paper raw material, a reactant obtained by subjecting polymer A to a Hofmann degradation reaction was used as an additive for manufacturing paper, and the reactant was supplied to a paper machine within a predetermined time, the percentage water content was low compared to Comparative Examples 1 to 4, and even when the total amount of aluminum sulfate used was reduced, the decreases in the degree of water-filterability and the product yield were small. Particularly, in Examples 3, 5, and 7 in which aluminum sulfate was not used, it was confirmed that the effect of enhancing the degree of water-filterability and the product yield was large compared to Comparative Example 1. In contrast, in Comparative Examples 1 to 4 in which pulp slurries for paper-making including added CPAM were used, it was confirmed that the total amount of aluminum sulfate used was decreased, and the decreases in the water-filterability and the product yield were large. From these results, it is understood that in the manufacturing methods of Examples 1 to 7, satisfactory water-filterability and product yield are obtained regardless of the presence or absence of the amount of addition of polyvalent metals such as aluminum sulfate, the hypochlorite would be 10:4. Thereby, a reaction liquid at pH 11 that would serve as an additive for manufacturing paper was produced. After a lapse of 4 hours from the start of reaction of the reaction liquid, this reaction liquid was added to the above-mentioned pulp solution at a rate of 0.5 kg/t (proportion of addition with respect to the solid content of the pulp slurry), and the mixture was stirred for 10 seconds at 800 rpm to produce a pulp slurry for paper-making. The pulp slurry for paper-making was introduced into a paper machine.

Example 9

A pulp slurry beaten to a CSF (Canadian Standard Freeness) value of 450 ml was produced by using 85% by mass of hardwood bleached pulp (LBKP) and 15% by mass of calcium carbonate, and the pulp slurry was diluted with tap water to a concentration of 1% by mass. Thus, a pulp solution was produced.

Meanwhile, an acrylamide polymer having a degree of anionization of 0.04 meq/g and an intrinsic viscosity of 14 dl/g was diluted, and sodium hypochlorite and a predetermined amount of sodium hydroxide were added such that the molar ratio of the acrylamide polymer and sodium hypochlorite would be 10:4. Thereby, a reaction liquid at pH 11 that would serve as an additive for manufacturing paper was produced. After a lapse of 4 hours from the start of reaction of the reaction liquid, this reaction liquid was added to the above-mentioned pulp solution at a rate of 1.0 kg/t (proportion of addition with respect to the solid content of the pulp slurry), and the mixture was stirred for 10 seconds at 800 rpm to produce a pulp slurry for paper-making. The pulp slurry for paper-making was introduced into a paper machine.

Comparative Example 5

A pulp slurry for paper-making was produced in the same manner as in Example 1, except that 0.5 kg/t of a cationic acryamide-based polymer (trade name: HI-FOAM 201, manufactured by Kurita Water Industries, Ltd.) was used as an additive for manufacturing paper. This pulp slurry for paper-making was introduced into a paper machine.

Comparative Example 6

A pulp slurry for paper-making was produced in the same manner as in Example 1, except that 0.5 kg/t of silica was added, and this pulp slurry for paper-making was introduced into a paper machine.

[Evaluation 2]

An evaluation of the pulp slurries for paper-making of Examples 8 and 9 and Comparative Examples 5 and 6 was carried out in the same manner as in Evaluation 1. The results are presented in Table 2.

TABLE 2

|  | Polymer (Polymer: Hypohalous acid) Amount of addition | CSF degree of water-filterability | Percentage water content of wet paper web [%] | DDA pressure [Mbar] | Product yield [%] |
| --- | --- | --- | --- | --- | --- |
| Example 8 | Polymer A (10:4) 0.5 kg/t | 512 | 72.3 | 216 | 81.2 |
| Example 9 | Polymer A (10:4) 1.0 kg/t | 535 | 71.6 | 211 | 83.5 |
| Comparative Example 5 | CPAM 0.5 kg/t | 488 | 75.5 | 186 | 79.5 |
| Comparative Example 6 | CPAM 500 g/t Silica 0.5 kg/t | 493 | 75.1 | 182 | 80.1 |

[Results and Discussion]

From the results of Table 2, it was confirmed that in Examples 8 and 9 in which hardwood bleached pulp (LBKP) was used as a paper raw material, a reactant obtained by subjecting the polymer A to a Hofmann degradation reaction was used as an additive for manufacturing paper, and the reactant was supplied to a paper machine within a predetermined time, the degree of water-filterability, the percentage water content of the wet paper web, the DDA pressure, and the product yield were all satisfactory compared to Comparative Examples 5 and 6 in which CPAM was used as an additive for manufacturing paper.

Example 10

A pulp slurry beaten to a CSF (Canadian Standard Freeness) value of 150 ml was produced using a corrugated cardboard of 100% old paper as a paper raw material, and the pulp slurry was diluted with tap water to a concentration of 1% by mass. Thus, a pulp solution was produced. To this pulp solution, aluminum sulfate was added in an amount of 1% by mass (proportion of addition with respect to the solid content of the pulp slurry).

An acrylamide polymer having a degree of anionization of 0.04 meq/g and a intrinsic viscosity of 14 dl/g (hereinafter, described as polymer A in the table) was diluted, and sodium hypochlorite and a predetermined amount of sodium hydroxide were added to the dilution such that the molar ratio of the acrylamide polymer and sodium hypochlorite would be 10:4. Thereby, a reaction liquid at pH 11 that would become an additive for manufacturing paper was produced. After a lapse of one hour from the start of reaction of the reaction liquid, this reaction liquid was added to the above-mentioned pulp solution at a rate of 0.5 kg/t (proportion of addition with respect to the solid content of the pulp slurry), and the mixture was stirred for 10 seconds at 800 rpm. Thus, a pulp slurry for paper-making was produced, and this pulp slurry for paper-making was introduced into a paper machine.

Example 11

The pulp slurry for paper-making obtained in Example 10 was introduced into a paper machine after a lapse of 4 hours from the start of reaction.

Example 12

A pulp slurry for paper-making was produced in the same manner as in Example 10, except that the pulp slurry for paper-making was adjusted to pH 6 using hydrochloric acid as a neutralizing agent, and sodium sulfite was used as a reducing agent. This pulp slurry for paper-making was introduced into a paper machine after a lapse of 4 hours from the start of reaction.

Comparative Example 7

The pulp slurry for paper-making obtained in Example 10 was introduced into a paper machine after a lapse of one week from the start of reaction.

Comparative Example 8

The pulp slurry for paper-making obtained in Example 12 was introduced into a paper machine after a lapse of one week from the start of reaction.

[Evaluation 3]

An evaluation of the pulp slurries for paper-making of Examples 10 and 11 and Comparative Examples 7 and 8 was carried out in the same manner as in Evaluation 3. The results are presented in Table 3.

TABLE 3

|  | pH | Time from start of reaction | CSF degree of water-filterability | Percentage water content of wet paper web [%] | DDA pressure [Mbar] | Product yield [%] |
|---|---|---|---|---|---|---|
| Example 10 | 11 or higher | 1 hour | 227 | 75.0 | 238 | 77.2 |
| Example 11 | 11 or higher | 4 hour | 220 | 75.3 | 241 | 76.9 |
| Example 12 | 6 | 4 hour | 214 | 75.7 | 243 | 76.1 |
| Comparative Example 7 | 11 or higher | 1 week | 165 | 78.3 | 280 | 66.2 |
| Comparative Example 8 | 6 | 1 week | 203 | 76.5 | 247 | 77.3 |

[Results and Discussion]

From the results of Table 3, in Examples 10 to 12 in which pulp slurries for paper-making that had been stored for 1 hour or 4 hours from the start of reaction, it was confirmed that the degree of water-filterability, the percentage water content of the wet paper web, the DDA pressure, and the product yield were all satisfactory compared to Comparative Examples 7 and 8, in which the pulp slurries for paper-making had been stored for one week. However, in Example 12 in which a neutralizing agent was added, the effect was low compared to Examples 10 and 11, and it can be seen that it is preferable not to use a neutralizing agent.

[Profile of Product Yield in Paper Machine Over Time]

The pulp slurry for paper-making of Example 1 and a paper raw material for middle layer were continuously introduced into a paper machine, and thus a coated white paperboard was produced. The profile of the product yield over time was investigated. Similarly, the pulp slurry for paper-making of Comparative Example 1 and a paper raw material for middle layer were continuously introduced into a paper machine, and a coated white paperboard was produced. The profile of the product yield over time was investigated. The results are presented in Table 4. In the paper machine, the pulp slurry for paper-making that had been stored for 4 hours from the start of a Hofmann degradation reaction was continuously supplied.

TABLE 4

|  | Time from start of supply into paper machine | Product yield |
|---|---|---|
| Example 1 | 0 hour | 83.6 |
|  | After 20 hours | 83.9 |
| Comparative Example 1 | 0 hour | 86.2 |
|  | After 1 hour | 83.1 |
|  | After 5 hour | 82.1 |

[Results and Discussion]

From the results of Table 4, it can be seen that in a case in which the pulp slurry for paper-making of Example 1 was used, a product yield of more than 83%, which was equal to or higher than Comparative Example 1 could be obtained stably.

In the present Example, the machine drive load of the paper machine was 75% in the case in which the pulp slurry for paper-making of Comparative Example 1 was used, while the machine drive load was decreased to 66.7% in the case in which the pulp slurry for paper-making of Example 1 was used.

Furthermore, in regard to the steam consumption at the drying unit of the paper machine, the spray dryer pressure was about 210 kPa in the case in which the pulp slurry for paper-making of Comparative Example 1 was used, while the spray dryer pressure was about 198 kPa in the case in which the pulp slurry for paper-making of Example 1 was used. Thereby, saving of about 0.1 t of steam/t of the product was made possible, and an enhancement of workability is enabled.

The cation demand was about 335 ueq/L in the case in which the pulp slurry for paper-making of Comparative Example 1 was used, while the cation demand was reduced to about 250 ueq/L in the case in which the pulp slurry for paper-making of Example 1 was used. It can be seen that an enhancement of workability is enabled thereby.

EXPLANATION OF REFERENCE NUMERALS

1 DEVICE FOR MANUFACTURING ADDITIVE FOR MANUFACTURING PAPER
2 REACTION MECHANISM
3 CHEMICAL INJECTION PUMP
4 PAPER MACHINE
10 POLYMER SUPPLY UNIT
20 HYPOHALOUS ACID SUPPLY UNIT
30 SODIUM HYDROXIDE SUPPLY UNIT
40 REACTION UNIT
41 TEMPERATURE SENSOR
42 LIQUID LEVEL SENSOR
43 pH SENSOR
50 STORAGE UNIT
51 TEMPERATURE SENSOR
52 LIQUID LEVEL SENSOR
53 pH SENSOR
100 DEVICE FOR MANUFACTURING PAPER

The invention claimed is:

1. A method for manufacturing paper, the method comprising:
   generating a reactant by subjecting an aciylarnide polymer to a Hofmann degradation reaction; and
   producing a pulp slurry for paper-making by supplying the reactant to a pulp solution within 4 to 24 hours from a start of the Hofmann degradation reaction without stopping the reaction; and
   supplying the pulp slurry suitable for paper-making to a paper machine within 4 to 24 hours from the start of the Hofmann degradation reaction without stopping the reaction,
   wherein the acrylamide polymer consists of an acrylamide polymer having a straight-chain structure, an intrinsic viscosity of 12.5 to 14dL/g, and a degree of anionization of 0.04meq/g or less,
   wherein the Hofmann degradation reaction comprises mixing a hypohalous acid into a liquid comprising the acrylamide polymer at a pH of 8.0 or higher,
   wherein no neutralizing agent is added in the Hofmann degradation reaction, and wherein the reactant does not comprise silica and does not comprise a cationic polymer other than the acrylamide polymer.

2. The method of claim 1, wherein, in the Hofmann degradation reaction, the pH is in a range of from 11 to 14.

3. The method of claim 1, wherein the Hofmann degradation reaction comprises adding an alkali, together with the hypohalous acid, into the liquid comprising the acrylamide polymer.

4. The method of claim 1, wherein the supplying of the pulp slurry to the paper machine is carried out when a degree of cationization of the reactant is 50% or higher with respect to a maximum degree of canonization achievable under conditions of the Hofmann degradation reaction.

5. The method of claim 1, wherein old paper, a paper raw material comprising a loading material, or a paper raw material having a content of polyvalent metals of 1% by mass or less with respect to the pulp slurry is used as a raw material of paper in the pulp.

6. The method of claim 1, wherein the hypohalous acid comprises a hypochlorous acid salt, a hypobromous acid salt, or a hypoiodous acid salt.

7. The method of claim 1, wherein the hypohalous acid comprises sodium hypochlorite, potassium hypochlorite, and lithium hypochlorite.

8. The method of claim 1, wherein the supplying of the pulp slurry to the paper machine is carried out when a degree of cationization of the reactant is 80% or higher with respect to a maximum degree of cationization achievable under conditions of the Hofmann degradation reaction.

9. The method of claim 1, wherein the Hofmann degradation reaction is performed at 10 to 30° C.

10. The method of claim 1, wherein the hypohalous acid comprises a hypochlorous acid salt.

11. The method of claim 1, wherein the hypohalous acid comprises a hypobromous acid salt.

12. The method of claim 1, wherein the hypohalous acid comprises a hypoiodous acid salt.

13. The method of claim 1, wherein the hypohalous acid comprises sodium hypochlorite.

14. The method of claim 1, wherein the hypohalous acid comprises potassium hypochlorite.

15. The method of claim 1, wherein the hypohalous acid comprises lithium hypochlorite.

16. The method of claim 1, wherein a molar ratio of the hypohalous acid salt and the acrylamide polymer is in a range of from 0.1:10 to 10:10.

* * * * *